United States Patent
Allan et al.

(10) Patent No.: US 6,354,648 B1
(45) Date of Patent: Mar. 12, 2002

(54) MOUNTING FOR CHILD-RESTRAINT SYSTEM IN VEHICLE

(75) Inventors: Ian Leonard Allan, Nr. Leamington Spa (GB); Jens Sauer, Warwickshire (DE)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/369,757

(22) Filed: Aug. 6, 1999

Related U.S. Application Data

(63) Continuation of application No. PCT/GB98/00573, filed on Feb. 24, 1998.

(30) Foreign Application Priority Data

Feb. 26, 1997 (EP) .............................. 9704003

(51) Int. Cl.⁷ ................................ B60N 2/28
(52) U.S. Cl. .................. 296/65.03; 296/63; 297/250.1; 297/253
(58) Field of Search ........................ 296/63, 64, 65.01, 296/65.03; 280/801.01, 801.2; 297/250.1, 253

(56) References Cited

U.S. PATENT DOCUMENTS

| | | | |
|---|---|---|---|
| 2,813,726 A | * | 11/1957 | Leonard |
| 2,848,250 A | * | 8/1958 | Sheren |
| 2,855,215 A | * | 10/1958 | Sheren |
| 3,664,140 A | * | 5/1972 | Kindelberger ............ 297/253 |
| 3,712,401 A | * | 1/1973 | Rothschild |
| 3,954,280 A | * | 5/1976 | Roberts et al. |
| 3,994,513 A | | 11/1976 | Courtis et al. |
| 4,133,556 A | * | 1/1979 | Glinski |
| 4,218,074 A | * | 8/1980 | Crawford |
| 4,611,854 A | * | 9/1986 | Pfeiffer ..................... 296/468 |
| 4,634,184 A | | 1/1987 | Hitson |
| 4,767,161 A | | 8/1988 | Sedlmayr et al. |
| 4,915,451 A | * | 4/1990 | Forget et al. ............... 297/468 |
| 4,928,992 A | * | 5/1990 | Qvint et al. ........... 296/65.1 X |
| 4,986,603 A | | 1/1991 | Hanai et al. |

(List continued on next page.)

FOREIGN PATENT DOCUMENTS

| | | |
|---|---|---|
| DE | 3107752 | 9/1982 |
| DE | 29604073 | 6/1996 |
| EP | 0164909 | 12/1985 |
| EP | 0552570 | 7/1993 |
| EP | 0619202 | 10/1994 |
| EP | 0694436 | 1/1996 |
| EP | 0703113 | 3/1996 |
| FR | 2635836 | 3/1990 |
| GB | 1416441 | 12/1975 |
| GB | 1595954 | 8/1981 |
| GB | 2137084 | 10/1984 |
| GB | 2254548 | 10/1992 |
| GB | 2260695 | 4/1993 |
| GB | 2277018 | 10/1994 |
| GB | 2297479 | 8/1996 |
| GB | 2302274 | 1/1997 |
| WO | 9838061 | 9/1998 |

OTHER PUBLICATIONS

Department of Transportation, 49 CFR Part 571.

*Primary Examiner*—Joseph D. Pape
(74) *Attorney, Agent, or Firm*—Foley & Lardner

(57) ABSTRACT

A child-restraint system is mounted in relation to a seat of a motor vehicle by a mount which includes a base portion secured to the vehicle structure and a mounting portion which extends to an accessible position upon the seat where it may be engaged by the restraint system, the mounting portion being able to be moved from its position on the seat when it is not required to be engaged by the child-restraint system.

10 Claims, 2 Drawing Sheets

U.S. PATENT DOCUMENTS

| | | | |
|---|---|---|---|
| 4,995,672 A | * 2/1991 | Corcoran | 297/483 |
| 5,263,763 A | * 11/1993 | Billette | 296/63 X |
| 5,332,261 A | * 7/1994 | Siepierski | 280/801.1 |
| 5,383,708 A | 1/1995 | Nagaska et al. | |
| 5,466,044 A | 11/1995 | Barley et al. | |
| 5,468,014 A | 11/1995 | Gimbel et al. | |
| 5,487,588 A | * 1/1996 | Burleigh et al. | 297/253 |
| 5,536,066 A | 7/1996 | Sedlack | |
| 5,609,367 A | * 3/1997 | Eusebi et al. | 280/801.2 X |
| 5,620,225 A | * 4/1997 | Harry | 296/63 |
| 5,641,254 A | * 6/1997 | Sullivan | 280/801.2 X |
| 5,669,663 A | 9/1997 | Feuerherdt | |
| 5,700,058 A | * 12/1997 | Balagurumurthy et al. | 296/63 X |
| 5,833,203 A | * 11/1998 | Denis et al. | 296/65.1 X |
| 5,855,047 A | * 1/1999 | Haas | 280/801.1 X |
| 5,918,934 A | 7/1999 | Siegrist | |
| 5,975,611 A | * 11/1999 | Hoshihars et al. | 296/65.03 |
| 6,030,044 A | * 2/2000 | Kosugi et al. | 296/65.01 X |
| 6,030,046 A | 2/2000 | Dorow | |
| 6,033,029 A | * 3/2000 | Henshall | 280/801.1 X |

\* cited by examiner

MOUNTING FOR CHILD-RESTRAINT SYSTEM IN VEHICLE

This is a continuation of International Application PCT/GB98/00573, with an international filing date of Feb. 24$^{th}$, 1998, which claims priority to a British application 9704003.4, with a filing date of Feb. 26$^{th}$, 1997.

BACKGROUND OF THE INVENTION

1. Technical Field

This invention generally relates to a mounting of a child-restraint system in a vehicle. The invention has been devised in a relation to such mounting in a road vehicle, and will hereafter be described in such a context, but it will be appreciated the invention may be more broadly applicable to other vehicles.

2. Discussion

Safety considerations and, in some areas, legislation, encourage small children traveling in motor vehicles to be restrained by equipment designed specifically for this purpose. The safety belts or other appliances usually provided in motor vehicles for assisting the safety of adults traveling in the vehicle by restraining them and preventing them from being thrown about within the vehicle in the event of an accident are not suitable for restraining children smaller than a certain size. The item of equipment most commonly used for child-restraint in motor vehicles is a so-called "child's safety seat," which is fitted in the vehicle in one of the seats thereof and provides seating accommodation of a size to accept a small child and is provided with restraining straps or the like to hold the child in the safety seat.

It is, of course, important that such a child's safety seat should be securely held in position in the vehicle. Fixing of a safety seat by use of the safety belts provided for adult restraint is one currently acceptable method. Other methods to improve the current state of the art are always desirable, particularly in the area of safety. Accordingly, there is a desire to provide a seat of a vehicle with mounting means being sufficiently strong and rigid to hold the child-restraint system in place if the vehicle should suffer an accident. At the same time, the mounting means should not interfere with the comfort and/or convenience of the seat when it is not in use for securing a child-restraint system.

In particular, there is a draft international standard known as ISOFIX for standardized universal attachment of child-restraint systems to vehicles. ISOFIX Scheme D employs two lower rigid (or semi-rigid) anchorages in a defined area of the seat bight (i.e. the region of intersection of the surfaces of the seat cushion and backrest portions), and an additional anchorage for use with a tether strap. The lower anchorages are designed to be used with tether hooks, small push-button buckles, or ISOFIX connectors. The dimensions and disposition of the lower anchorages are specified in the ISOFIX standard.

SUMMARY OF THE INVENTION

It is broadly the object of the present invention to meet the above-described requirements as far as possible, in providing ISOFIX lower anchorages.

According to the one aspect of the present invention, the present invention provides a vehicle including a seat and a mounting means for mounting a child-restraint system in relation to said seat, said mounting means comprising a base portion secured to the vehicle structure and/or seat and a mounting portion extending to an accessible position upon the seat and adapted for engagement by the restraint system, such mounting portion being able to be removed from its position upon the seat when it is not required to be used.

According to another aspect of the invention, the present invention provides a mounting means for mounting a child-restraint system in relation to a vehicle seat, including a base portion adapted to be secured in relation to the vehicle structure and a mounting portion adapted to extend to an accessible position upon the seat and removable from said position upon the seat when not required to be used.

Preferably, the base portion of the mounting means is connected or adapted for connection to the vehicle structure (e.g. the floor pan of the vehicle) beneath the lower end of a backrest portion of the seat and at the rear of a cushion portion of the seat, whilst the mounting portion is arranged to extend between the backrest and cushion portion of the seat for engagement by the restraint system above the rear of the cushion portion and at the bottom of the backrest portion, i.e. adjacent the bight of the seat.

The mounting portion may be completely removable from the base portion, or alternatively may be movably (e.g. pivotally) connected thereto so as to be movable between operative and stowed positions.

In the case of a mounting means whose mounting portion is completely removable from the base portion thereof, the portions may have engagement by a releasable fastening, for example of a type analogous to that used for the fastening buckles for vehicle safety belts. To engage the mounting portion to the base portion, the mounting portion may be simply pushed through the "bight-line" between the backrest and cushion portions of the seat until it cooperates with the base portion and snaps into engagement between the mounting and base portions. Removal may require operation of a catch-releasing element (e.g. a push-button) of the fastening means.

In the case of a mounting means whose mounting portion is pivotable relative to the base portion, which will in general be required to be used with a seat which is able to be folded. Such seats are characteristically used as the rear seats in passenger cars of the hatchback or estate car type but also in some saloon cars, and have a seat cushion portion which can be pivoted forwardly and upwardly about an axis adjacent its lower edge relative to the vehicle structure. When the cushion has been pivoted forwardly and upwardly, the mounting portion will be able to be moved either to or from its operative position in which it extends between the back and cushion portions of the seat, after which the seat cushion can be returned to its normal position. Preferably the mounting portion is pivotable forwardly and downwardly from its operative position to its stowed position, in which latter position it is disposed beneath a rear part of the seat cushion portion.

The mounting portion preferably affords two mounting elements in the form of anchorages of the configuration and disposition specified by ISOFIX, spaced laterally of the seat, for cooperation with corresponding fastening means on a child-restraint system.

BRIEF DESCRIPTION OF THE DRAWINGS

The various advantages of the present invention will become apparent to one skilled in the art upon reading the following specification and by reference to the drawings which include.

DETAILED DESCRIPTION OF THE PREFERRED EMBODIMENTS

Figure 1:
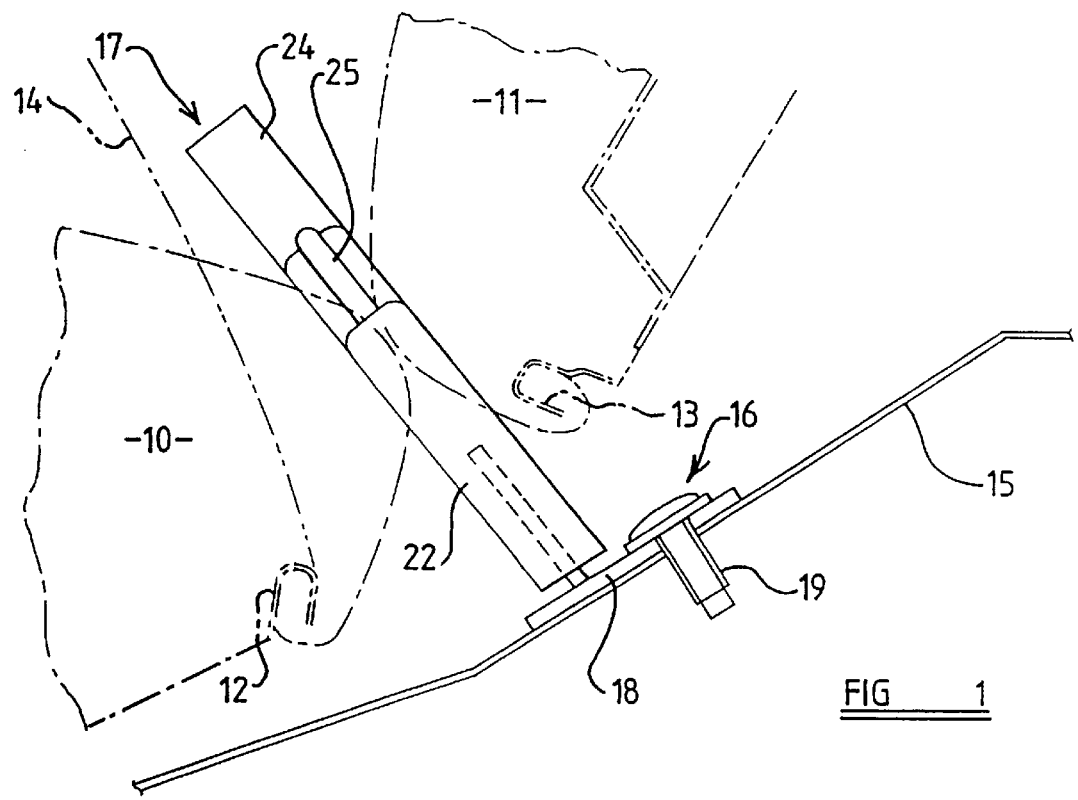
FIG. 1 is a diagrammatic elevation of a first embodiment of the invention, shown in relation to part of a seat of a vehicle.
Figure 2:
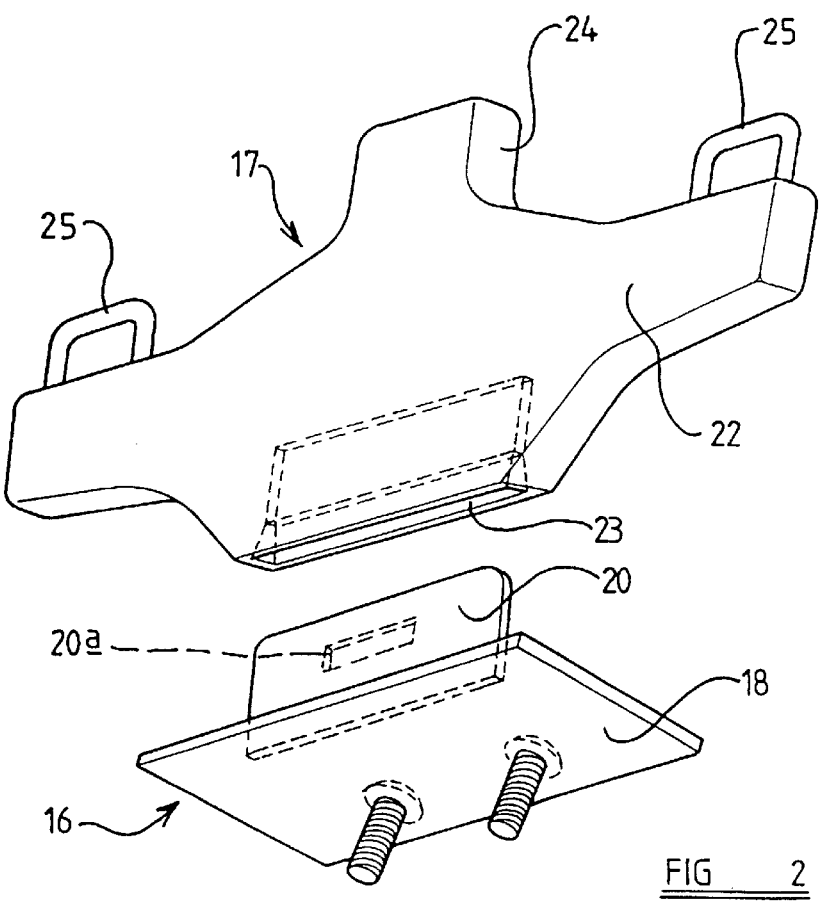
FIG. 2 is a diagrammatic perspective view of the device shown in FIG. 1.

Referring firstly to FIGS. 1 and 2 of the drawings, there is shown a lower rear part of a vehicle seat, the seat comprising a cushion portion 10 and a backrest portion 11. Each of these portions comprises upholstery materials disposed on a rigid frame: part of the frame of the cushion portion is indicated at 12 and part of the frame of the backrest portion at 13. The upholstered rearmost part of the cushion portion 10 and lowermost part of the backrest portion 11 approach or touch one another, but it will be appreciated that by virtue of the resilient nature of the upholstery on each of these portions it is possible for a component to be inserted therebetween, as will be described hereafter. The cushion portion 10 may be tiltable upwardly and forwardly about an axis, not shown, adjacent its front end. In the course of such movement of the cushion portion, the frame member 12 moves in an arcuate path of movement as indicated by the line 14. Part of a floor portion of the vehicle structure or the frame of the seat is indicated at 15.

To provide for mounting of a child-restraint system to the seat, there is provided mounting means in the form of a base portion indicated generally at 16 and a mounting portion indicated generally at 17. The base portion 16 includes a plate 18 which may be secured to the vehicle floor 15 by bolts as indicated at 19, whilst a wall portion 20 is upstanding from the plate 18 in the direction towards the contacting parts of the seat cushion and backrest portions.

The mounting portion 17 extends between the adjacent parts of the seat cushion and backrest portions to engage the base portion 16. The mounting portion 17 includes a body 22 having a slot 23 into which the wall portion 20 is closely engagable, and there is provided releasable fastening means for holding them in such engagement. Such fastening means may be similar or analogous to the fastening means commonly used in the buckles of vehicle safety belts, and include a catch member engagable with an opening 20a in the wall portion, and spring biasing means so that when placed together in cooperating parts, the parts snap into engagement with one another and are thereafter held in engagement. The parts may be released by operation of a push-button or the like which preferably is disposed in a part 24 of the body 22 which is accessible in use above the rear of the seat cushion portion.

The body further is provided with two spaced mounting elements or anchorages each in the form of generally U-shaped metal element 25. These are spaced and dimensioned as laid down by ISOFIX to be engagable by a child-restraint system such as a child's safety seat, to secure the latter to the seat of the vehicle. Such engagement will be by way of suitable releasable fastening means. It will be appreciated that such a child-restraint system can, but need not, be further secured to the seat of the vehicle by at least one further mounting device in addition to that illustrated.

Figure 3:
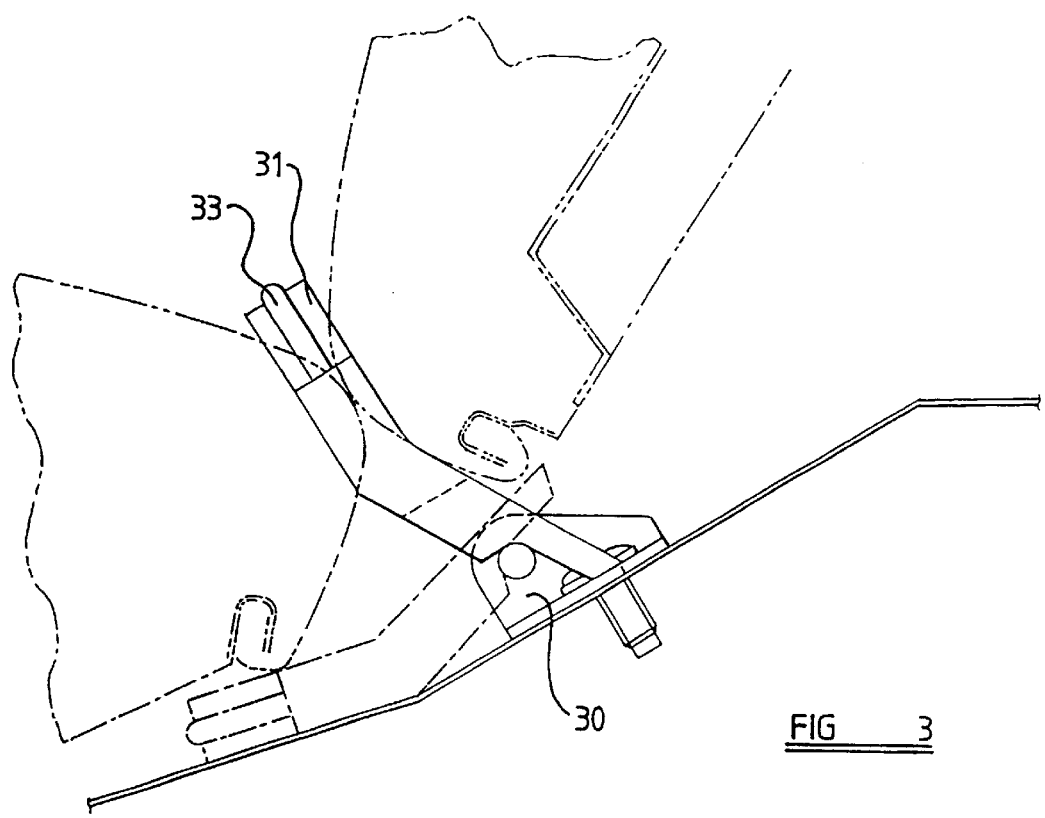
FIG. 3 is a view of FIG. 1 but of a further embodiment of the invention.
Figure 4:
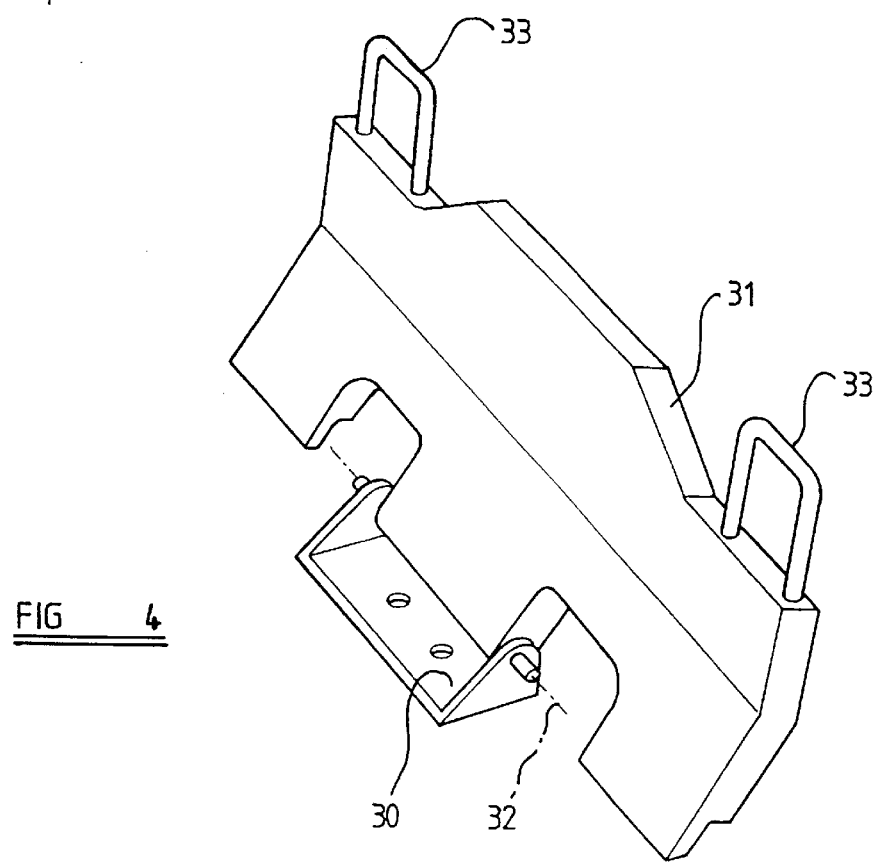
FIG. 4 is a perspective view of the embodiment of FIG. 3.

Referring now to FIGS. 3 and 4 of the drawings, these show a further embodiment of the invention. There is a seat arranged as above described, but the mounting means for the child safety system includes a base portion 30 and mounting portion 31 which are pivotally secured to one another for angular movement about an axis 32. The base portion 30 is fitted to the floor structure of the vehicle as above described, whilst the mounting portion 31 is able to be pivoted between the operative position (shown in full lines in FIG. 3) wherein it extends between the cushion portion and backrest portion of the seat so that mounting elements 33 are accessible, and an inoperative or stowed position (shown in broken lines in FIG. 3). In the latter position the part of the mounting portion 31 having the mounting elements 33 lies against the floor of the vehicle immediately beneath the rear of the seat cushion portion.

In order to move the mounting portion between such positions, the cushion portion of the seat must be pivoted forwardly and upwardly, such as indicated by the line 14 in FIG. 1, until it is clear of both the mounting portion 31 and the backrest portion of the seat. The resilience of the upholstery of the seat enables the seat cushion portion to be moved past the mounting portion 31 when the latter is in its operative position. In some vehicle seat systems, a pivotable blade-like mounting portion may be utilized in conjunction with a seat which does not fold in the manner above described.

Although the invention will usually be used in relation to a rear seat of a passenger-carrying motor vehicle, it will be appreciated that in certain circumstances it may be used in relation to a front seat of such a vehicle, or more broadly in relation to a seat of any vehicle.

The foregoing discussion discloses and describes the preferred embodiments of the present invention. One skilled in the art will readily recognize from such discussion, and from the accompanying drawings and claims, that various changes, modifications, and variations can be made therein without departing from the true spirit and fair scope of the invention as defined in the following claims.

What is claimed is:

1. A vehicle comprising:

a vehicle structure;

a seat having a seat cushion and a seat backrest; and a mounting device having a base portion and a mounting portion, said base portion being connected to said vehicle structure, and said mounting portion having a first end extending to an accessible position when said seat is in an occupant use position, wherein said first end of said mounting portion comprises two mounting elements fixedly spaced laterally of the seat and proximate the bight of the seat, wherein said mounting portion is releasably engageable proximate the bight of the seat with an ISOFIX connector of a child-restraint system when in the accessible position, and wherein said mounting portion is selectively movable from the accessible position.

2. The vehicle of claim 1 wherein said base portion of said mounting device is secured directly to said vehicle structure, beneath a lower end of said seat backrest and at a rear end of said seat cushion.

3. The vehicle of claim 1 wherein said mounting portion is removably detachable from said base portion.

4. The vehicle of claim 3 wherein said base portion and said mounting portion are selectively engageable by a releasable fastening.

5. The vehicle of claim 4 wherein said releasable fastening provides for snap engagement between said mounting portion and said base portion.

6. The vehicle of claim 1 wherein said first end of said mounting portion includes two mounting elements which are spaced from one another to cooperate with and engage corresponding fastening members on the child-restraint system.

7. A mounting system for mounting a child-restraint system in relation to a seat of a vehicle, said mounting system comprising:

a base portion securable to the vehicle; and a mounting portion having an operative position extending through a bight line of the seat, said mounting portion comprising two mounting elements fixedly spaced laterally of the seat and proximate the bight line of the seat for releasable engagement by the child-restraint system proximate the bight line of the seat, and said mounting portion being removable from said base portion with a snap engagement when not required to be used.

8. A vehicle having a body and including a seat and a mounting means for mounting a child-restraint system in relation to the seat, said mounting means being independent of a safety belt provided in association with the seat, said mounting means comprising a base portion secured to one of the vehicle body and the seat, and a mounting portion extending to a bight of the seat above the rear of a cushion portion and at the bottom of a backrest portion thereof, said mounting portion including two mounting elements fixedly spaced laterally of the seat and proximate the bight of the seat for releasable engagement by the child-restraint system proximate the bight of the seat, and said mounting portion being able to be removed from said position at the bight of the seat when not required to be used.

9. A vehicle according to claim 8 wherein the base portion of the mounting means is connected to the vehicle structure beneath the lower end of the backrest portion of the seat and at the rear of the cushion portion of the seat, and the mounting portion extends between said backrest and cushion portions into the bight of the seat.

10. A vehicle according to claim 8 wherein the mounting portion is completely removable from the base portion, having engagement therewith by releasable fastening means.

* * * * *